(12) United States Patent
Kamioka

(10) Patent No.: US 9,471,972 B2
(45) Date of Patent: Oct. 18, 2016

(54) SOLDER PRINT INSPECTING DEVICE

(71) Applicant: Yosuke Kamioka, Aichi (JP)

(72) Inventor: Yosuke Kamioka, Aichi (JP)

(73) Assignee: CKD Corporation, Aichi (JP)

( * ) Notice: Subject to any disclaimer, the term of this patent is extended or adjusted under 35 U.S.C. 154(b) by 116 days.

(21) Appl. No.: 14/245,968

(22) Filed: Apr. 4, 2014

(65) Prior Publication Data

US 2014/0307948 A1  Oct. 16, 2014

(30) Foreign Application Priority Data

Apr. 16, 2013  (JP) ................... 2013-085367

(51) Int. Cl.
*G06T 7/00* (2006.01)

(52) U.S. Cl.
CPC ........... *G06T 7/0004* (2013.01); *G06T 7/0008* (2013.01); *G06T 7/0057* (2013.01); *G06T 2207/10152* (2013.01); *G06T 2207/30152* (2013.01)

(58) Field of Classification Search
None
See application file for complete search history.

(56) References Cited

U.S. PATENT DOCUMENTS

2006/0267018 A1* 11/2006 Yamazaki ............... H01L 27/12
257/66
2013/0204563 A1*  8/2013 Hirai ................... G01B 11/285
702/82

FOREIGN PATENT DOCUMENTS

JP       2006267018 A1 *  5/2006
JP       2006-267018 A    10/2006

* cited by examiner

*Primary Examiner* — Kim Vu
*Assistant Examiner* — Fred Hu
(74) *Attorney, Agent, or Firm* — Osha Liang LLP

(57) ABSTRACT

A solder print inspecting device includes three-dimensional measurement lighting unit that directs a specific light at a printed substrate, a CCD camera for imaging the printed substrate that is illuminated by the light, three-dimensional calculating unit that performs a three-dimensional measurement of cream solder based on image data, etc., and displaying unit that displays a three-dimensional image showing a three-dimensional shape of the cream solder, along with displaying an arrow image showing an operating direction of a squeegee in a solder printing machine, an arrow image showing a conveying direction of the printed substrate, etc.

18 Claims, 10 Drawing Sheets

SOLDER PRINT INSPECTING DEVICE

CROSS-REFERENCE TO RELATED APPLICATIONS

This application claims priority to Japanese Patent Application No. 2013-085367 filed on Apr. 16, 2013 in Japan.

BACKGROUND OF INVENTION

1. Field of the Invention

The present invention relates to a solder print inspecting device for inspecting the state of printing of cream solder that is printed on a printed substrate.

2. Background Art

In a manufacturing line for mounting electronic components on a printed substrate, first cream solder is printed, by a solder printing machine, onto lands that are disposed on the printed substrate. Following this, electronic components are provisionally mounted on the printed substrate based on the viscosity of the cream solder. Thereafter, the printed substrate is introduced into a reflow furnace, and soldering is performed through a specified reflow process.

Typically, in this type of manufacturing line, the state of the cream solder that is printed by the solder printing machine is inspected. At the time of this inspection, in recent years solder print inspecting devices that perform pass/fail evaluations of the state of printing, based on the three-dimensional shape of the cream solder, measured in three dimensions, have been used.

One known solder print inspecting device of this type is able to display an enlarged three-dimensional image, showing the three-dimensional shape of the cream solder that has been printed on a specific land, when a solder defect has been detected, in order to, for example, enable an operator to determine whether or not the printing defect evaluation was correct (referencing, for example, Patent Citation 1).

Given this, when a printing defect occurs, the operator references the three-dimensional image, or the like, of the cream solder that is displayed in enlargement, to determine the correctness of the printing defect evaluation, and also to determine whether or not there is a problem with the solder printing machine, such as whether or not the settings for operating the squeegee are correct, whether or not the metal mask is soiled, and the like. If here the evaluation is that there is a problem with the solder printing machine, then, maintenance operations are performed on the solder printing machine, such as adjusting the operating settings for the squeegee, cleaning the metal mask, or the like.

[Patent Citation 1] Japanese Unexamined Patent Application Publication 2006-267018

However, when three-dimensional images of the cream solder that is printed on the individual lands are displayed in enlargement, if it is not possible to discern the direction of operation of a specific operation that is performed by the solder printing machine in relation to the substrate, such as, for example, the direction of operation of the squeegee, then, will not be possible to discern the relative direction of the three-dimensional image of the cream solder in relation to the direction of the operation, meaning that there is the risk of not being able to discover promptly the occurrence of problems in the solder printing machine, and, by extension, the causes of those problems, tendencies in the occurrence thereof, locations where they have occurred, and so forth.

One or more embodiments of the present invention were created in contemplation of the situation set forth above, and the object thereof is to provide a solder print inspecting device that enables easy discernment of the direction of a displayed three-dimensional image of the solder.

SUMMARY OF INVENTION

Various embodiments of the invention for addressing the above issue will be explained individually below. As may be required, the characteristic operational effects of the embodiments will also be described.

1st Embodiments: In one or more embodiments of the present invention, a solder print inspecting device for inspecting solder printed on a substrate by a solder printing machine, includes: a lighting unit that directs a specific light toward the substrate; an imaging unit that images the substrate illuminated with the light; a three-dimensional calculating unit that performs a three-dimensional measurement of the solder based on image data imaged by the imaging unit; an inspecting unit that performs an inspection of the solder based on a value measured by the three-dimensional calculating unit; and an image processing unit that performs a process for displaying, on a specific displaying unit, a three-dimensional image showing a three-dimensional shape of the solder viewed from an arbitrary viewing direction based on a value measured by the three-dimensional calculating unit. The image processing unit performs a process for displaying a direction image, showing an operating direction of a specific operation performed by the solder printing machine on the substrate (for example, the "direction of transport of the substrate" or the "direction of operation of the squeegee," or the like), together with the three-dimensional image of the solder.

According to the 1st Embodiments of the present invention, not only can a three-dimensional image showing the three-dimensional shape of the solder, viewed from an arbitrary viewing direction be displayed on the specific displaying unit, but also a direction image showing the operating direction of a specific operation that is performed by the solder printing device on the substrate can also be displayed thereon. This enables the operator to ascertain immediately the relative direction of the three-dimensional image of the solder, on the displaying unit, relative to the operating direction of a specific operation by the solder printing machine. As a result, this enables the early discovery of the occurrence of a problem in the solder printing machine, and, by extension, the early discovery of the cause for the occurrence, tendencies in occurrences, locations of occurrences, and the like, making it possible to prevent reductions in productivity.

Note that the "displaying unit" may be a structure that is provided by the solder print inspecting device itself, or may be a structure provided external to the solder print inspecting device.

2nd Embodiments: In one or more embodiments of the present invention, a solder print inspecting device as set forth in the 1st Embodiments, the image processing unit performs a process for displaying, as a direction image showing the operating direction of the specific operation, a direction image showing an operating direction of a squeegee.

The 2nd Embodiments of the present invention enable a three-dimensional image of the solder to be viewed while checking the direction of operation of the squeegee. Doing so makes it possible to discern the tendencies in occurrences of printing defects relative to the squeegee operation, facilitating early discovery of, for example, defects in the operational settings for the squeegee, soiling of the metal mask, and the like.

For example, in a solder printing machine, if the squeegee pressure is too high, or if the angle of attack of the squeegee is too large, then, the leading edge of the squeegee will dig into the opening portions of the metal mask, gouging out the solder that is filled therein, so that the state of the solder that is printed on the lands will be in a form, and there is less on the upstream side in the direction of motion of the squeegee, and rising up on the downstream side (referencing FIG. 9).

On the other hand, if the pressure of the squeegee is too light, or if the angle of attack of the squeegee is too small, then, the force that pushes the solder into the opening portions of the metal mask will be insufficient and, thus, the adhesion of the solder to the lands on the substrate will be insufficient within the opening portions of the metal mask. The result is that the solder will remain in the opening portions of the metal mask when the metal mask is removed, not only causing the amount of solder that is printed onto the lands to be inadequate, but also disrupting the shape thereof. In such a case, raised portions will be formed at the upstream side of the direction of operation of the squeegee as well.

Moreover, when there is soiling on one side of the metal mask, in relation to the direction of operation of the squeegee, there will be a tendency to form raised portions on that side.

That is, when an operator views the three-dimensional image of the solder when a printing defect has occurred, understanding the direction of operation of the squeegee can be makes it possible to evaluate whether or not the pressure of the squeegee is too high or too low.

3rd Embodiments: In one or more embodiments of the present invention, a solder print inspecting device as set forth in the 1st or 2nd Embodiments, the image processing unit performs a process for displaying, as a direction image showing the operating direction of the specific operation, a direction image showing a conveying direction of the substrate.

The 3rd Embodiments of the present invention enable viewing of the three-dimensional image of the solder while checking the direction of conveyance of the substrates. Doing so facilitates ascertaining the relationship between the orientation of the substrate and the three-dimensional image of the solder. This facilitates ascertaining the relationships between the two when comparing the actual substrate and the three-dimensional image that is displayed.

Moreover, ascertaining the direction of conveyance of the substrate in a configuration, the direction of operation of the squeegee in relation to the direction of conveyance of the substrate is always the same makes it possible to ascertain the direction of operation of the squeegee indirectly, even if the direction of operation of the squeegee is not shown directly, such as in the 2nd Embodiments. The result is the ability to produce the same effects in operation as for the 2nd Embodiments.

4th Embodiments: In one or more embodiments of the present invention, a solder print inspecting device as set forth in any one of the 1st through the 3rd Embodiments, the image processing unit performs a process for displaying front/back information (including letters, an image, or the like), and the front/back of the substrate can be identified, along with the three-dimensional image of the solder.

4th Embodiments of the present invention enable viewing of the three-dimensional image of the solder while confirming front versus back of the substrate. Doing so facilitates ascertaining the relationship between the front versus back of the substrate and the three-dimensional image of the solder. This facilitates ascertaining the relationship between the two when comparing the actual substrate and the three-dimensional image that is displayed. In particular, this is more effective when the shape of the substrate (the peripheral edge shape) is symmetrical between the front and the back.

5th Embodiments: In one or more embodiments of the present invention, a solder print inspecting device as set forth in any one of the 1st through 4th Embodiments, the image processing unit perform a process for displaying a substrate image (a reduced drawing, reduced image, or the like) and, at least, the shape of the substrate (the peripheral edge shape) can be identified, along with the three-dimensional image of the solder.

The 5the Embodiments of the present invention enable viewing of the three-dimensional image of the solder while checking the shape of the substrate. Doing so facilitates ascertaining the relationship between the orientation of the substrate, the front versus back face, and the three-dimensional image of the solder. The result is the same effect in operation as in the 3rd and 4th Embodiments, or the like.

6th Embodiments: In one or more embodiments of the present invention, a solder print inspecting device as set forth in any one of the 1st through the 5th Embodiments, the image processing unit performs processing so as to change the viewing direction based on a specific operation of an inputting unit to rotate, and display on the displaying unit, the three-dimensional image of the solder, and perform a process for rotating, and displaying on the displaying unit, the various types of images that are displayed along with the three-dimensional image of the solder, while maintaining the relative relationships with the three-dimensional image.

For example, in the 1st Embodiments, when the three-dimensional image of the solder is rotated, there is concern that the orientation of the three-dimensional image would become confused. Thus, the above described effects of the 1st Embodiments become more effective under the configuration of the 6th Embodiments.

7th Embodiments: In one or more embodiments of the present invention, a solder print inspecting device as set forth in any one of the 1st through the 6 the embodiments, includes: a communicating unit that receives, from the solder printing machine, various types of information relating to the substrate, including direction information relating to an operating direction of a specific operation. The image processing unit performs processing based on the various types of information regarding the substrate.

For example, there are also solder printing machines of a type, in which the direction of operation of the squeegee is not always the same, such as the direction of operation of the squeegee alternating between being from the back side to the front side or being from the front side to the back side of the solder printing machine. In such cases, it is not possible to register the direction of operation of the squeegee, or the like, in advance in the solder print inspecting device, and the various types of processes, such as the direction image display process, cannot be performed.

In regards to this point, the 7 the Embodiments of the present invention enable information regarding the direction of operation of the squeegee, and the like, to the inputted from the solder printing machine, thereby enabling the various types of processes, set forth above, to be performed appropriately.

Other aspects and advantages of the invention will be apparent from the following description and the appended claims.

DETAILED DESCRIPTION

Figure 1:
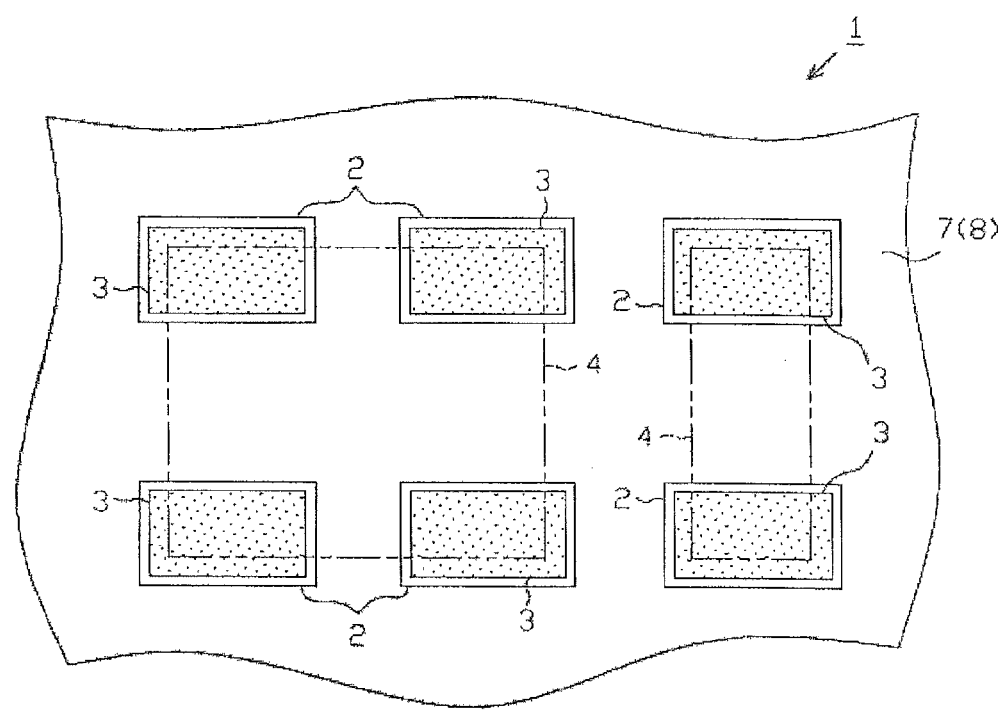
FIG. 1 is a partial enlarged plan view diagram enlarging a portion of a printed substrate according to one or more embodiments of the present invention.

A solder print inspecting device in one or more embodiments of the claimed invention will be explained below. First, the structure of the printed substrate that is subject to inspection by the solder print inspecting device will be explained in reference to FIG. 1. FIG. 1 is a partial enlarged plan view diagram enlarging a portion of the printed substrate.

As illustrated in FIG. 1, the printed substrate 1 has an interconnect pattern (not shown) and a plurality of lands 2 formed from a copper film on a flat base substrate 7 made from a glass epoxy resin, or the like. Moreover, the base substrate 7 is coated with a resist film 8, on the parts except for the lands 2. A cream solder 3, which has viscosity, is printed over the individual lands 2. Note that in FIG. 1, for convenience, a dot pattern is applied to the parts showing the cream solder 3.

Figure 2:
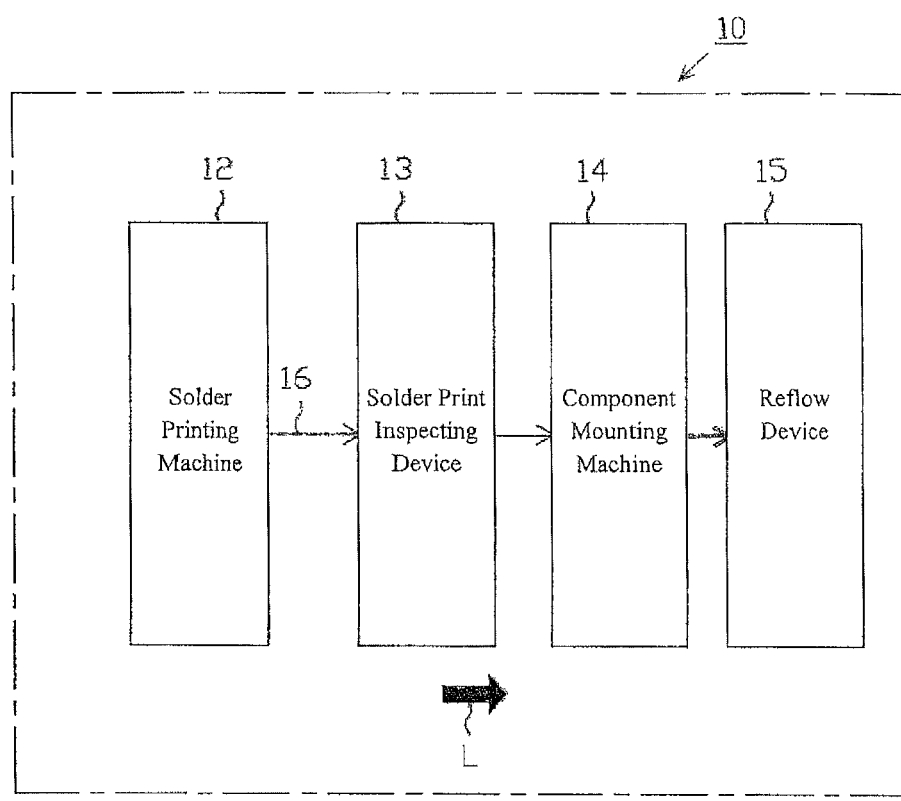
FIG. 2 is a block diagram illustrating the structure of a manufacturing line for a printed substrate according to one or more embodiments of the present invention.

A manufacturing line for manufacturing the printed substrates 1 will be explained next in reference to FIG. 2. FIG. 2 is a block diagram illustrating the structure of a manufacturing line 10 for the printed substrate 1. In the manufacturing line 10 in the present embodiment, the settings are such that the printed substrate 1 is conveyed from the left to the right, when viewed from the front side.

As illustrated in FIG. 2, a solder printing machine 12, a solder print inspecting device 13, a component mounting machine 14, and a reflow device 15 are disposed, in that order, from the upstream side (the left side in FIG. 2) in the manufacturing line 10. Consequently, the conveying direction L of a printed substrate 1 in the various machinery and equipment 12 through 15 is also arranged in the direction from left to right, when viewed from the front side.

Figure 3:
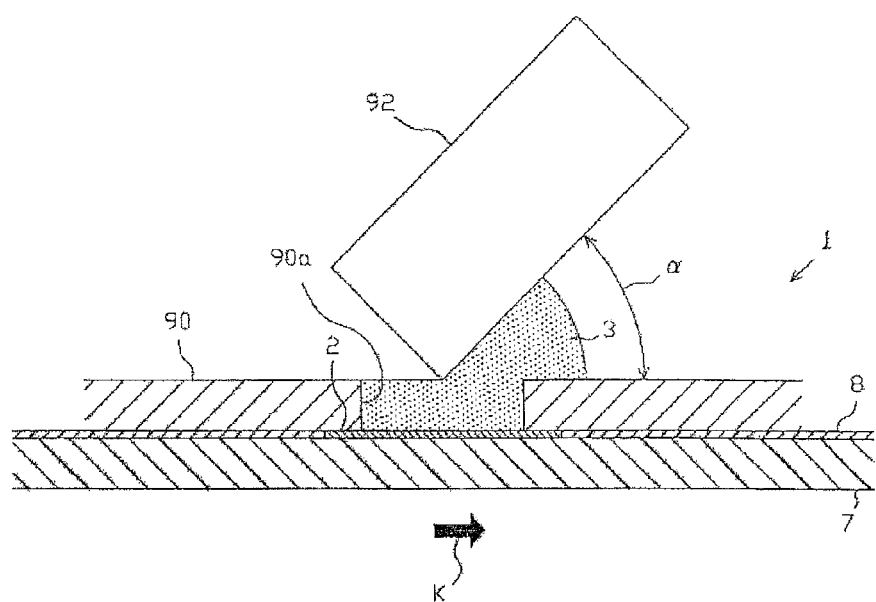
FIG. 3 is a schematic diagram illustrating a printing operation by a solder printing machine according to one or more embodiments of the present invention.

The solder printing machine 12 is for printing the cream solder 3 in a specific amount on to the lands 2 of the printed substrate 1. As illustrated in FIG. 3, the solder printing machine 12 is provided, for example, with a flat plate-shaped metal mask 90 wherein a plurality of opening portions 90a are formed corresponding to the individual lands 2 on the printed substrate 1, and a squeegee 92 that slides along the top face of the metal mask 90.

Given this, when performing the solder printing, first the metal mask 90 is disposed layered on the printed substrate 1. Following this, the cream solder 3 is supplied to the top face of the metal mask 90. After this, the squeegee 92 is moved sliding in a specific direction along the top face of the metal mask 90. That is, the specific direction is the operating direction K of the squeegee 92.

Note that the operating direction K of the squeegee 92 in the present embodiment is set so as to be in the direction from the back side to the front side when the solder printing machine 12 is viewed from the front, and is the same direction each time.

Moreover, the squeegee 92 slides while applying pressure (the printing pressure) to the metal mask 90, in a state wherein the leading edge portion of the squeegee 92 is inclined at a specific angle relative to the metal mask 90. That is, the specific angle is the angle of attack a of the squeegee 92.

The result of filling the cream solder 3 into the opening portions 90a of the metal mask 90 in this way is that a specific amount of cream solder 3 is printed onto the lands 2. Finally the metal mask 90 and the printed substrate 1 are separated, to complete solder printing through the cream solder 3 being pulled out from the opening portions 90a (mask removal).

The solder print inspecting device 13 is for inspecting the state of the cream solder 3 that has been printed as described above (inspecting, for example, the printing position, height, volume, etc.). The details of the solder print inspecting device 13 will be described below.

The component mounting machine 14 is for mounting the electronic components 4 (referencing FIG. 1), such as computer chips, on the cream solder 3 that has been printed. The electronic components 4 have a plurality of electrodes or leads, and the individual electrodes or leads are provisionally mounted on the respective specific cream solders 3.

The reflow device 15 heats and melts the cream solder 3, to perform solder bonding (soldering) of the lands 2 and the electrodes or leads of the electronic components 4.

Note that in the manufacturing line 10, conveyors 16, or the like, as a conveying unit for conveying the printed substrates 1, are provided between the individual devices, such as between the solder printing machine 12 and the solder print inspecting device 13 (referencing FIG. 2). Moreover, although not illustrated, a branching device is provided between the solder print inspecting device 13 and the component mounting machine 14. Given this, a printed substrate 1 that is evaluated as a passing product by the solder print inspecting device 13 is directed to the component mounting machine 14 on the downstream side thereof, while, on the other hand, a printed substrate 1 that is evaluated as a failing product is rejected, by the branching device, to a failed product storing portion.

Figure 4:
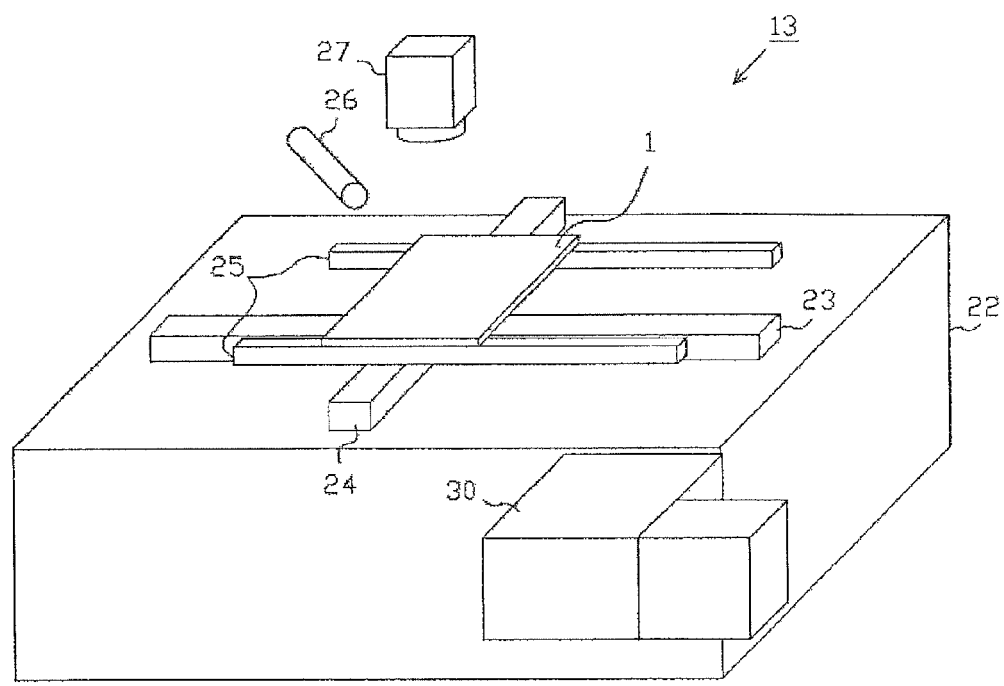
FIG. 4 is a perspective diagram illustrating schematically a schematic structure for a solder print inspecting device according to one or more embodiments of the present invention.

The structure of the solder print inspecting device 13 will be explained in detail next, referencing FIG. 4. FIG. 4 is a perspective diagram illustrating schematically a schematic structure for a solder print inspecting device 13.

The solder print inspecting device 13 is provided with a base 22, where an X axis moving mechanism 23 and a Y axis moving mechanism 24 are provided on the base 22. A rail 25, on which the printed substrate 1 is placed, is provided on the Y axis moving mechanism 24.

Given this, the X axis moving mechanism 23 and the Y axis moving mechanism 24 are operated to cause the rail 25, on which the printed substrate 1 is placed, to move sliding in the X-axial direction and the Y-axial direction. This enables the printed substrate 1 to be moved in and arbitrary direction (the X-axial direction and the Y-axial direction).

Furthermore, although omitted from the drawings, a conveying unit for conveying the printed substrate 1 are provided on the rail 25.

For example, a pair of conveyor belts for conveying the printed substrate 1 in the specific conveying direction (which, in the present embodiment, is the left-right direction in FIG. 4) along the lengthwise direction of the rail, a motor for driving the conveyor belts, and the like, are provided.

Given the structure set forth above, the printed substrate 1 that is conveyed from the upstream side (which, in the present embodiment, is the left side in FIG. 4) into the solder print inspecting device 13 and is guided onto the rail 35, is guided until a specific location, by the rotation of the conveyor belt and, then, is pressed by a chuck, or the like, to position the rail 25 at a specific position. Given this, after the inspection, the pressing by the chuck, or the like, is released, and, at the same time, the printed substrate 1 is conveyed out to the downstream side (which, in the present embodiment, the right side in FIG. 4) by the solder print inspecting device 13 through the rotation of the conveyor belts.

Of course, the structure of the rail 25 is not limited to the form set forth above, but rather a different structure may be used instead.

Moreover, the solder print inspecting device 13 is provided with a three-dimensional measurement lighting unit 26, as a "lighting unit" for illuminating a specific light component pattern from above at an angle relative to the top face (either the front face or the back face) of the printed substrate 1, a CCD camera 27 as an "image capturing unit" for capturing an image of the printed substrate 1 that is illuminated with the light component pattern, and a controlling unit 30 for controlling the various types of controlling and imaging processes, calculating processes, and the like, within the solder print inspecting device 13.

The controlling unit 30 are a computer equipped with a CPU, a ROM, a RAM, an I/O, a free-run counter, and the like, where the individual unit 31 through 33 are connected electrically. Given this, there are functions for performing the input/output control of various types of data and signals between the unit 31 through 33, and the like.

The CCD camera 27 is disposed directly over the printed substrate 1, and is able to capture images of the parts of the printed substrate 1 illuminated by the light component pattern. The image data captured by the CCD camera 27 is converted into digital signals within the CCD camera 27, and inputted, in the form of digital signals, into the controlling unit 30. Given this, the controlling unit 30, based on the image data, performs image processing and a detecting procedure, and the like, as described below.

Given this, in the controlling unit 30, image processing is performed based on the image data for the printed substrate 1 captured by the CCD camera 27, to perform a three-dimensional measurement (primarily, a height measurement and a volume measurement) of the cream solder 3 based on a specific three-dimensional measuring method. Thereafter, an inspection is performed in relation to the cream solder 3 based on the various values that have been measured by the three-dimensional measurement. Consequently, the controlling unit 30 are structured from the "detecting unit" and the "image processing unit" in the present embodiment.

Figure 5:
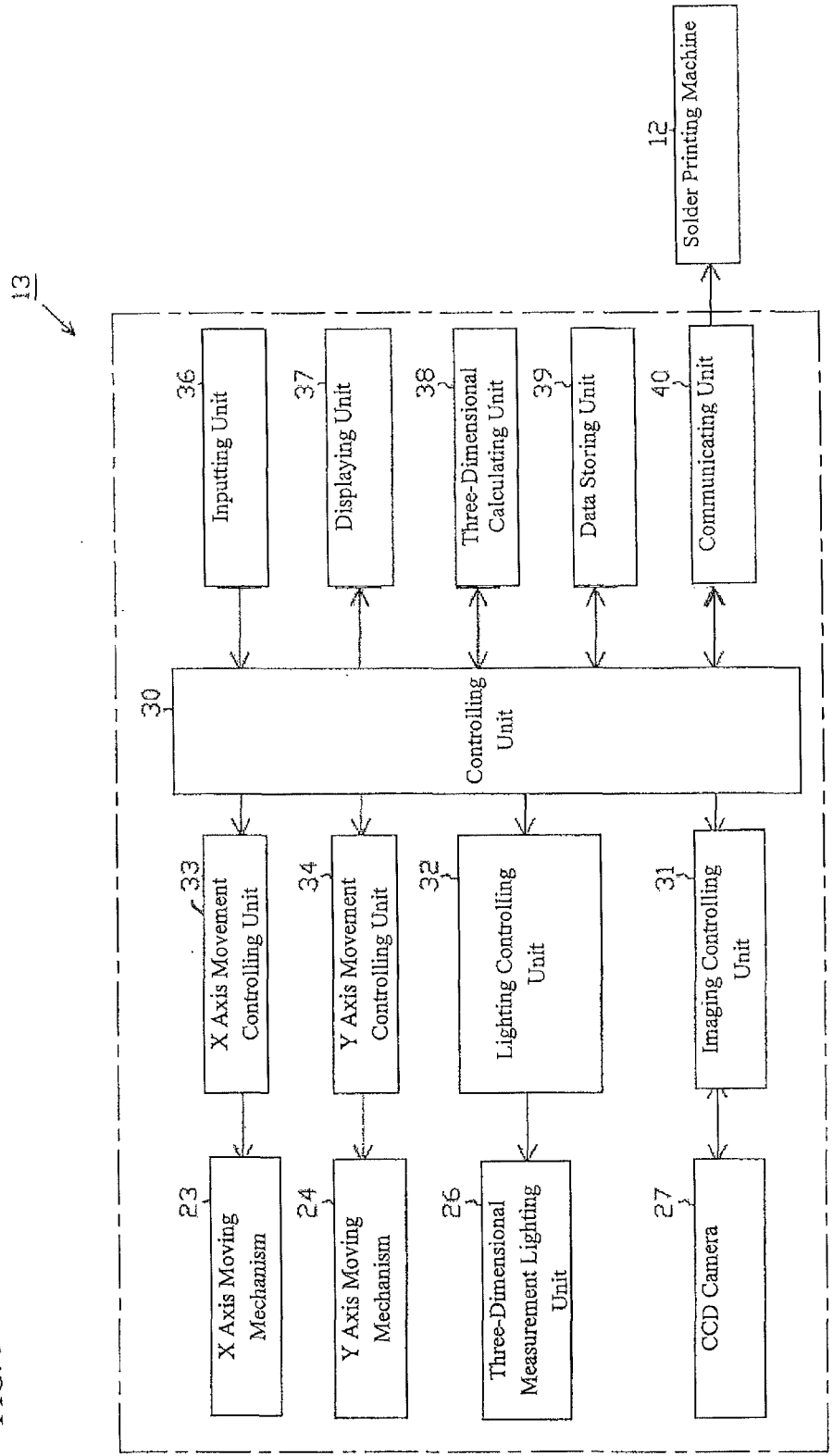
FIG. 5 is a block diagram illustrating the electrical structure a solder print inspecting device according to one or more embodiments of the present invention.

The electrical structure of the solder print inspecting device 13 will be explained in next in reference to FIG. 5. FIG. 5 is a block diagram illustrating the electrical structure of the solder print inspecting device 13.

The solder print inspecting device 13 is provided with an imaging controlling unit 31 for executing imaging by controlling the imaging timing, and the like, of the CCD camera 27, a lighting controlling unit 32 for controlling the three-dimensional measurement lighting unit 26, a X axis movement controlling unit 33 for controlling the X axis moving mechanism 23, and a Y axis movement controlling unit 34 for controlling the Y axis moving mechanism 24.

The imaging controlling unit 31 perform imaging control of the CCD camera 27 based on control signals outputted from the controlling unit 30.

The lighting controlling unit 32 perform lighting control for the three-dimensional measurement lighting unit 26, based on control signals outputted from the controlling unit 30.

The X axis movement controlling unit 33 and the Y axis movement controlling unit 34 perform driving control of the X axis moving mechanism 23 and the Y axis moving mechanism 24 based on respective control signals outputted from the controlling unit 30.

Moreover, the solder print inspecting device 13 includes: an inputting unit 36 that are structured from a keyboard, mouse, touch panel, or the like; a displaying unit 37 having a displaying portion 37a such as a CRT or liquid crystal; a three-dimensional calculating unit 38 for performing the three-dimensional measurement of the cream solder 3 based on the image data, and the like, captured by the CCD camera 27; a data storing unit 39 for storing various types of data, such as the image data, the three-dimensional measurement results, the inspection results, and the like; and a communicating unit 40 for exchanging various types of information with external devices, such as the solder printing machine 12 or the branching device, described above.

The individual unit 36 through 40 are connected electrically to the controlling unit 30. As a result, various types of data, such as the image data and three-dimensional measurement results and inspection results, and the like, stored in the data storing unit 39, can be displayed on the displaying portion 37a of the displaying unit 37. Moreover, the communicating unit 40 are connected to external devices, such as the solder printing machine 12, through a LAN (Local Area Network) cable, or the like.

Figure 6:
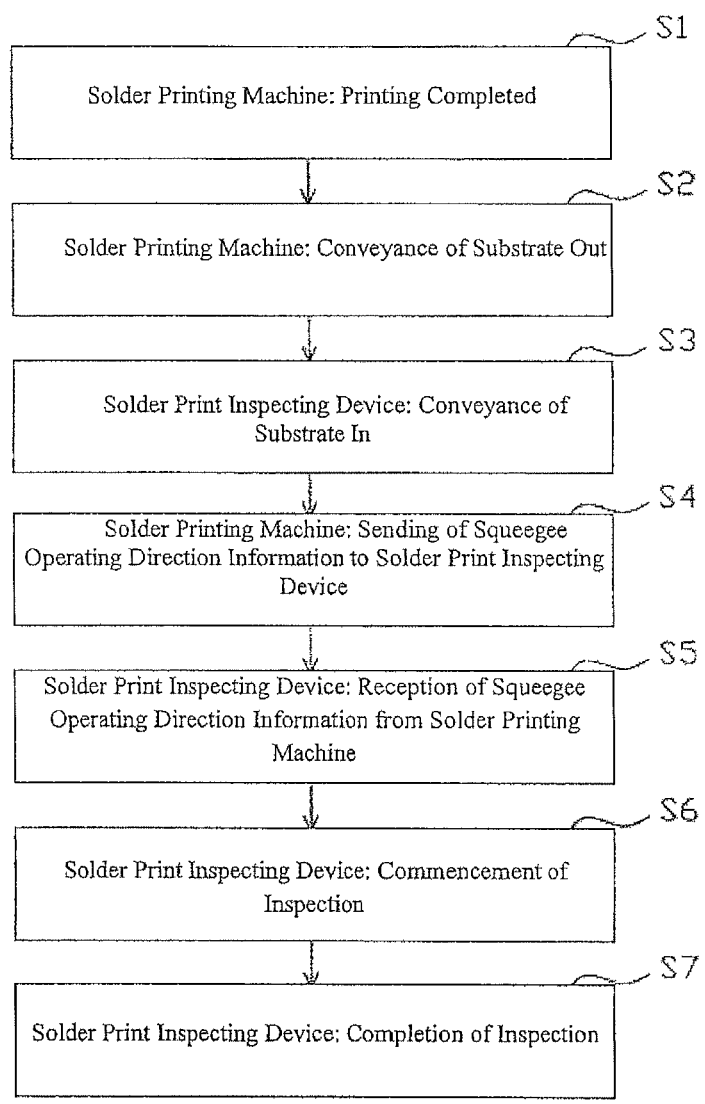
FIG. 6 is a flowchart showing the flow of the steps from the time of completion of solder printing by the solder printing machine until the completion of inspection by the solder print inspecting device according to one or more embodiments of the present invention.

The procedure for the inspection, by the solder print inspecting device 13, of the printed substrate 1 for which the solder printing by the solder printing machine 12 has been completed will be explained in detail next, referencing FIG. 6. FIG. 6 is a flowchart illustrating the series of procedures from the point in time of the completion of the solder printing by the solder printing machine 12 until the completion of the inspection by the solder print inspecting device 13.

The solder printing machine 12, upon completion of the solder printing onto the printed substrate 1 (Step S1), conveys the printed substrate 1 out to the conveyor 16 on the downstream side (Step S2).

Given this, the printed substrate 1 that is conveyed to the solder print inspecting device 13 by the conveyor 16 is conveyed into the solder print inspecting device 13 (Step S3).

Together with this, the solder printing machine 12 sends, to the solder print inspecting device 13, various types of information regarding the printed substrate 1, such as information regarding the operating direction K of the squeegee 92 relative to the printed substrate 1 that has been conveyed out (direction information), or information regarding the conveying direction L of the printed substrate 1 (direction information), and the like (Step S4).

On the other hand, the solder print inspecting device 13, upon receipt of the various types of information regarding the printed substrate 1 that has been conveyed in, such as information regarding the operating direction K of the squeegee 92, from the solder printing machine 12 (Step S5), stores that information in the data storing unit 39 and, then, begins the inspection of the printed substrate 1 (Step S6).

The state of the inspection by the solder print inspecting device 13 will be explained in detail here. In the solder print inspecting device 13, when a printed substrate 1, which has been conveyed in, as described above, is placed at a specific position, the light component pattern is illuminated from the three-dimensional measurement lighting unit 26 onto a specific location of the printed substrate 1, based on an instruction from the controlling unit 30, and also an image of the specific location on the printed substrate 1, illuminated by the light component pattern, is captured by the CCD camera 27.

The imaging is performed by the inspection area unit, set for the printed substrate 1. Given this, the printed substrate 1 is sequentially moved by the aforementioned moving mechanisms 23 and 24, to enable imaging of the entirety of the printed substrate 1.

The image data captured by the CCD camera 27 is converted into digital signals within the CCD camera 27 and, then, inputted into the controlling unit 30, in the form of digital signals, to be stored in the data storing unit 39.

Given this, the three-dimensional measurement is performed by the three-dimensional calculating unit 38 based on the image data that is stored in the data storing unit 39.

In the present embodiment, the height (peak height and average height), volume value, and three-dimensional shape, and the like, of the cream solder 3 that is printed on the printed substrate 1 is measured. Note that while, in the present embodiment, the phase shift method is used when performing the three-dimensional measurement, a beam blocking method, a space encoding method, a focusing method, or another arbitrary measuring method may be used instead.

The measurement result is stored in the data storing unit 39, and a pass/fail evaluation is performed by the controlling unit 30 based on the measurement results.

In more detail, the controlling unit 30 performs the pass/fail evaluation of the state of printing of the cream solder 3 for each individual land 2 on the printed substrate 1 (including whether or not there are solder bridges, or the like, formed between multiple lands) by comparing the measurement result, stored in the data storing unit 39, to reference data that is stored in advance.

For example, in the present embodiment, whether or not the "rise (peak height)" is within the reference range, whether or not there is "inadequate printing", whether or not the "area" is within the reference range, whether or not the "volume" is within the reference range, whether or not the "average height" is within the reference range, whether or not the "misalignment" in the X-axial direction is within the reference range, whether or not the "misalignment" in the Y-axial direction is within the reference range, whether or not there is a "no-solder" state wherein the cream solder 3 is missing, and the like, are set as inspection items. The inspection items are not limited to these, but rather may be set arbitrarily.

The controlling unit 30 performs, for each individual land 2 and for each inspection item, a "passing product evaluation (OK)" or a "failing product evaluation (NG)." Given this, if there has been a passing product evaluation for the state of printing of the cream solder 3 for all of the lands 2 on the printed substrate 1, then, the result is a "passing product evaluation (OK)" for the printed substrate 1. On the other hand, if there is even a single "failing product evaluation (NG)" in the individual pass/fail evaluations (the pass/fail evaluation for each individual land 2 and for each individual inspection item), then, the result is a "failing product evaluation (NG)" for the printed substrate 1 as a whole.

Thereafter, the controlling unit 30 completes the inspection by storing the evaluation result for the printed substrate 1 for which the pass/fail evaluation was performed (including the evaluation results for each of the individual lands 2 and the individual inspection items) in the data storing unit 39 together with the aforementioned image data and measurement results, and the like, for that printed substrate 1 (Step S7).

At the same time, the controlling unit 30 performs an updating process for the control information for ascertaining its own state. For example, when there has been a passing product evaluation, the controlling unit 30 increments by 1 the value of a passing product count number stored in its own memory, or the like, and update, to a "0," which indicates "Production in progress," the value of an operating status flag for evaluating its own operating status.

On the other hand, in the event of a failing product evaluation, the controlling unit 30 increments by 1 a failing product count number that is stored in its own memory, or the like, and update, to "1," which indicates "Paused," the value of the operating status flag.

Following this, the controlling unit 30 references the value of the operating status flag, and if the value is "1," which indicates "Paused," places the solder print inspecting device 13 into a paused state by, for example, pausing the operation for conveying the printed substrate 1 by the rail 25. Together with this, the operator is informed that a failing product has been produced through, for example, illuminating a tower light, not shown.

Figure 7:
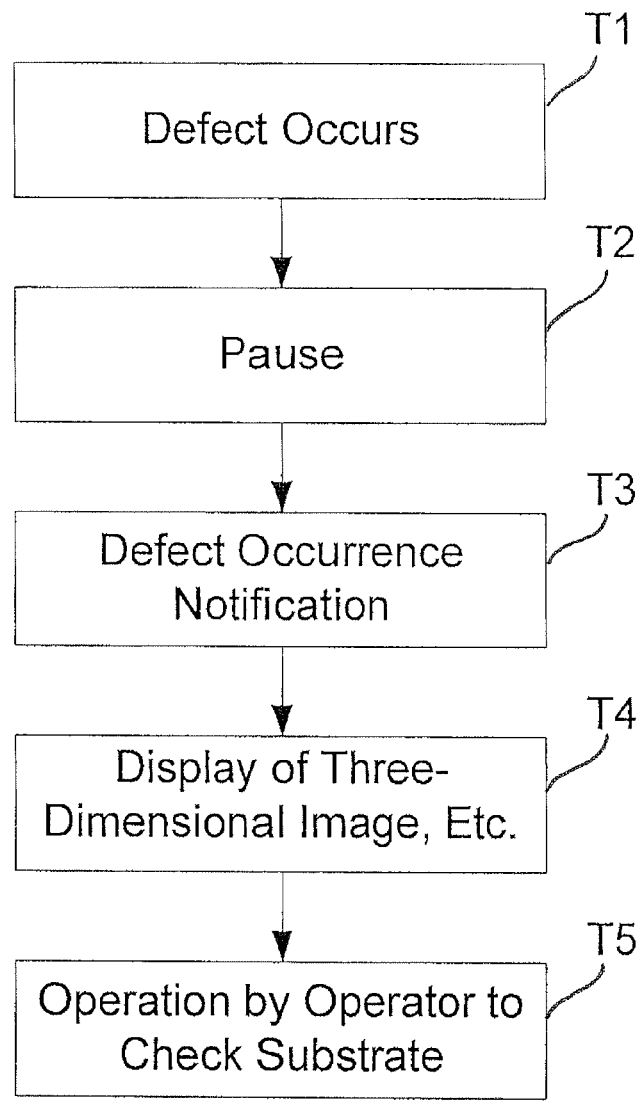
FIG. 7 is a flowchart for explaining the flow of the steps regarding the processing operations in the solder print inspecting device when a defective product has been produced, according to one or more embodiments of the present invention.

The form of operation, by the solder print inspecting device 13, when a printed substrate 1 that has been evaluated as a failing product has been produced, and the form of the display in the displaying portion 37*a* of the displaying unit 37, will be explained in detail next referencing the figures. FIG. 7 is a flowchart for explaining the flow of the processing operations when a failing product has occurred in the solder print inspecting device 13.

Note that the displaying portion 37*a*, in the present embodiment, is structured using a touch panel, so as to function also as a portion of the inputting unit 36.

As illustrated in the flowchart in FIG. 7, when, in the solder print inspecting device 13, there has been a failing product evaluation in relation to a specific printed substrate 1 (Step T1), the solder print inspecting device 13 is paused (Step T2). Specifically, the operation for conveying the printed substrate 1 out by the rail 25 is paused and, initially, the operation for conveying a new printed substrate 1 in, and the inspecting operation, are also paused. Moreover, the applicable information is sent through the communicating these 40 to another external device, such as the solder printing machine 12. Doing so not only pauses the operation of the solder print inspecting device 13 when a failing product has occurred in the solder print inspecting device 13, but also pauses, with the appropriate timing, other external devices as well, causing the entire manufacturing line 10 (except for those devices and processes that are unaffected).

Following this, the solder print inspecting device 13 uses a notifying unit, such as a tower light, or the like, to provide notification, to the operator, to the effect that a failing product has been produced (Step T3).

Figure 8:
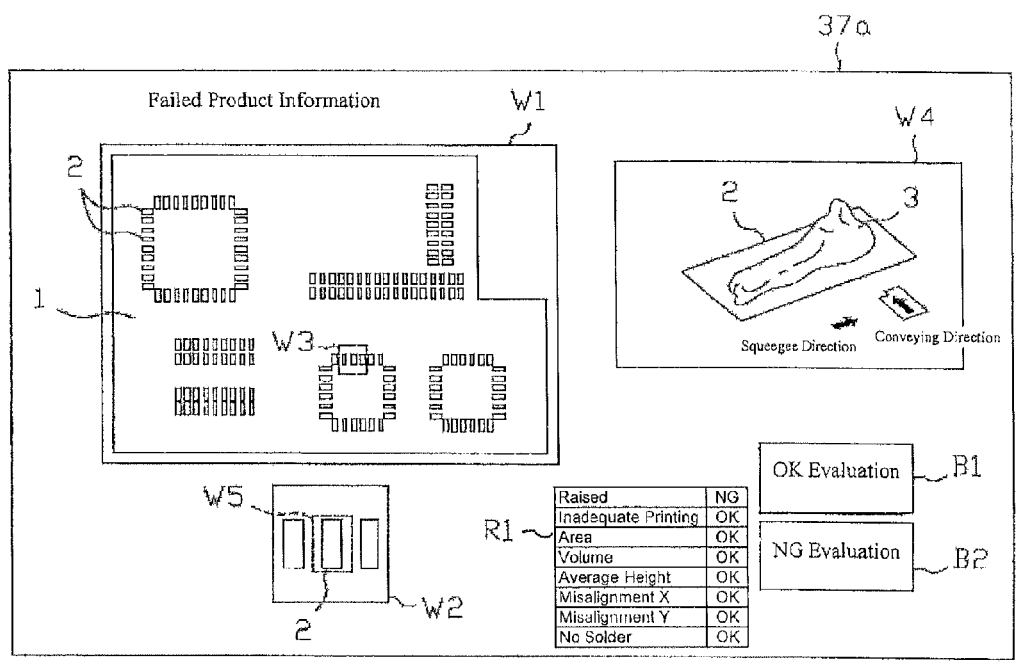
FIG. 8 is a schematic diagram illustrating one example of the state of the display in the displaying portion of the displaying unit according to one or more embodiments of the present invention.

The operator, seeing this, turns to the solder print inspecting device 13, and checks the failing product, either through the displaying portion 37a of the displaying unit 37 or through removing the printed substrate 1 from the solder print inspecting device 13. A "Failed Product Information" screen, such as illustrated in FIG. 8, for example, is displayed on the displaying portion 37a of the displaying unit 37 (Step T4).

A main display window W1 able to display the entirety of the printed substrate 1, for example, is provided in the "Failed Product Information" screen. Two-dimensional image data of a printed substrate 1 imaged in the past, for example, design data such as Gerber data that is prepared in advance, and the like, are displayed in the main display window W1.

Additionally, a sub-display window W2, for enlarged displaying of the inspection area that includes the location wherein the defect occurred, and the like, is provided in the "Failed Product Information" screen. If there are multiple locations wherein defects occurred, then, here a plurality of sub-display windows W2 is displayed. Moreover, and area window W3 for identifying the area corresponding to the sub-display window W2 is displayed in the main display window W1.

Furthermore, an enlarged display window W4 that is able to display an enlargement of one land 2 that includes a location wherein a defect occurred is provided in the "Failed Product Information" screen. If, at this point, there is a plurality of locations wherein defects occurred, then, it is possible to switch the subject that is displayed in the enlarged display window W4 through selecting any one of the sub-display windows W2, of which a plurality is displayed, as described above. Moreover, a land window the W5, for identifying the land 2 corresponding to the enlarged display window W4, is displayed in the sub-display window W2.

Figure 9:
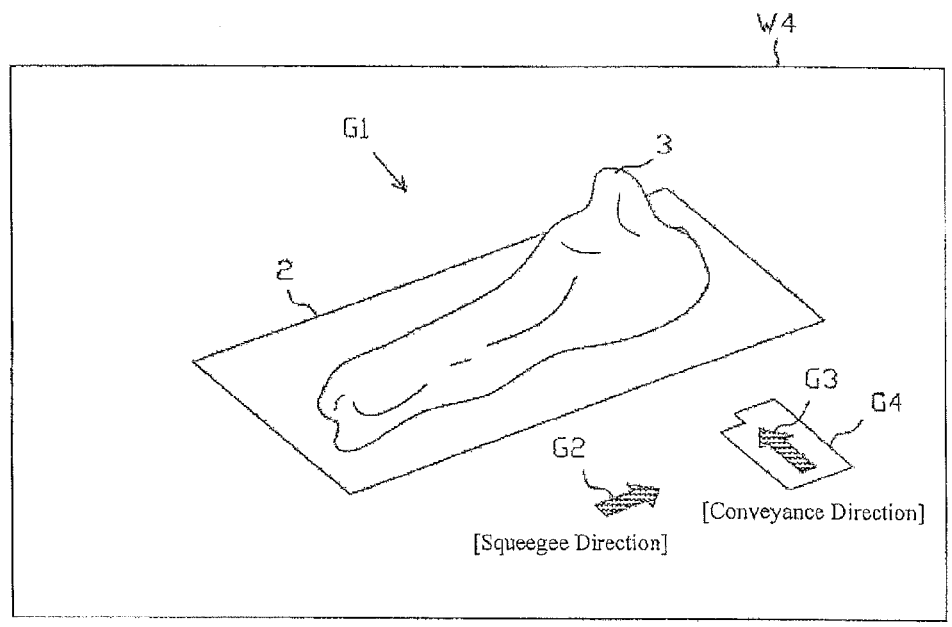
FIG. 9 is a schematic diagram illustrating one example of the state of display in the enlarged display window according to one or more embodiments of the present invention.
Figure 10:
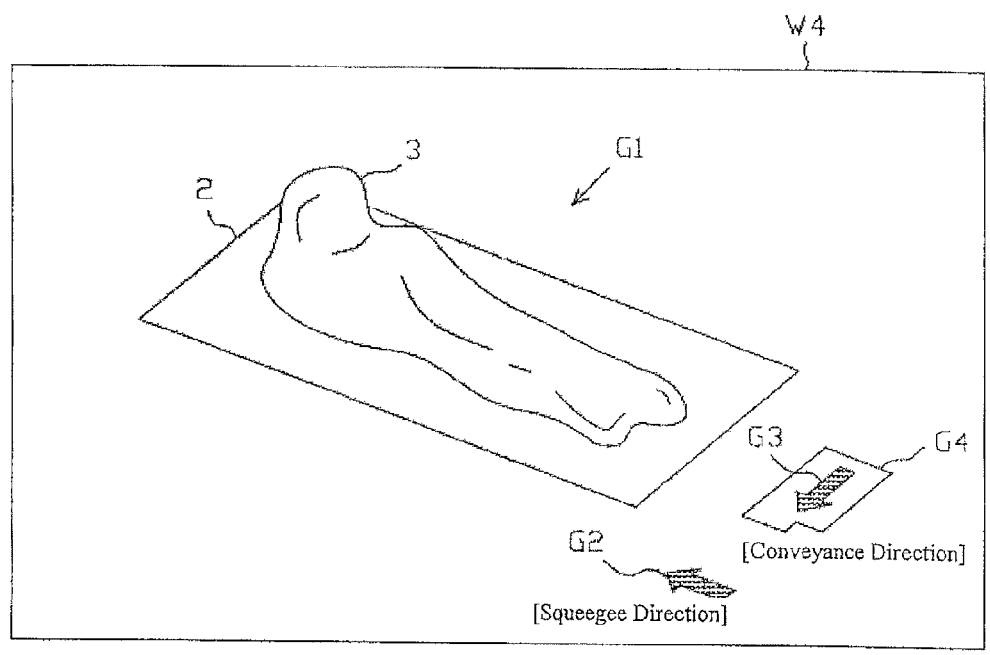
FIG. 10 is a schematic diagram illustrating one example of the state of display in the enlarged display window according to one or more embodiments of the present invention.

In the present embodiment, a three-dimensional image G1 that shows the three-dimensional shape of the cream solder 3 that is printed on the specific land 2 is displayed in the enlarged display window W4 (referencing FIG. 9 and FIG. 10). The three-dimensional image G1 is displayed based on the three-dimensional data that is stored in the data storing unit 39, and is formed so as to enable displaying by rotating, through operating the inputting unit 36, so as to enable viewing from an arbitrary viewing direction.

Moreover, along with the three-dimensional image G1 of the cream solder 3, an arrow image G2, as a direction image indicating the operating direction K of the squeegee 92, and an arrow image G3, as a direction image indicating the conveying direction L of the printed substrate 1, are also displayed in the enlarged display window W4.

Furthermore, a schematic substrate image G4 is displayed, overlaid on the arrow image G3, in the enlarged display window the W4 so as to produce a reduced display of the printed substrate 1. The substrate image G4 is displayed in a state wherein it is possible to identify, at least, the shape of the printed substrate 1 (the peripheral edge shape).

These three-dimensional image G1, arrow image G2, arrow image G3, and substrate image G4 are each displayed with the orientations thereof maintaining the same relative relationships as the relative relationships in relation to the actual printed substrate 1. Consequently, when the three-dimensional image G1 is rotated and displayed as described above, the arrow image G2, the arrow image G3, and the substrate image G4 are also rotated and displayed, with each maintaining its relative relationship with the three-dimensional image G1 (referencing FIG. 9 and FIG. 10).

In this structure, the operator who performs an operation for checking the printed substrate 1 for which there has been a failing product evaluation references the three-dimensional image G1, and the like, that is displayed on the "Failed Product Information" screen, to determine whether or not the evaluation result for the printed substrate 1 for which there was the failing product evaluation (the state of printing of the cream solder 3) was correct (Step T5). Depending on the case, the checking operation may be performed by removing the printed substrate 1 from the solder print inspecting device 13 and comparing the printed substrate 1 with the three-dimensional image G1, and the like, on the "Failed Product Information" screen.

In addition, the operator references the three-dimensional image G1, and the like, to determine also whether or not there is a problem with the solder printing machine 12. It is possible to ascertain the tendencies of occurrences of printing defects related to the squeegee operation by viewing the three-dimensional image G1 while comparing with the arrow image G2, the arrow image G3, and the substrate image G4, enabling an evaluation as to whether or not the operating settings for the squeegee 92 are correct in whether or not the metal mask 90 has become soiled.

For example, if the three-dimensional image G1 of the cream solder 3, as illustrated in FIG. 9 and FIG. 10, has a shape that is low on the upstream side in the operating direction of the squeegee and raised on the downstream side, the operator can infer that, as a problem that has occurred in the solder printing machine 12, a case wherein the pressure of the squeegee 92 is too great, a case wherein the angle of attack a of the squeegee 92 is too large, a case wherein soiling has occurred in the opening portions 90a of the metal mask 90 on the downstream side in the direction of operation of the squeegee, or the like.

Moreover, when a printed substrate 1 is removed from the solder print inspecting device 13 to perform a checking operation on that printed substrate 1, displaying the arrow image G3 and the substrate image G4 makes it easy to ascertain the orientation and front/back orientation of the printed substrate 1, and the relative relationships with the three-dimensional image G1.

If the determination here is that there is a problem in the solder printing machine 12, then, a maintenance operation is performed on the solder printing machine 12, such as adjusting the operating settings for the squeegee 92 or cleaning the metal mask 90.

Given this, a list R1 of the various inspection items and of the inspection items for which the evaluation result can be displayed, and an "OK Evaluation" button B1 and an "NG Evaluation" button B2, by which the operator can send, to the solder print inspecting device 13, instructions for handling, are displayed in the "Failed Product Information" screen.

Given this, when the evaluation is that the failing product evaluation result for the printed substrate 1 by the solder print inspecting device 13 was correct (and, if a maintenance operation is performed on the solder printing machine 12, as described above, then, after the completion thereof), the "NG Evaluation" button B2 is pressed to corroborate the evaluation result by the solder print inspecting device 13.

When the "NG Evaluation" button B2 is pressed, the solder print inspecting device 13 not only releases the pause of the operation for conveying the printed substrate 1 out by the rail 25, but also outputs, to the branching device, a rejection signal indicating that that printed substrate 1 is to be rejected. Doing so causes the printed substrate 1, for which there was the failing product evaluation, to be rejected to the failed product storing portion.

Thereafter, the solder print inspecting device 13 updates the value of the operating status flag from the "1," which indicates "Paused," to "0," which indicates open Production in Progress," to return to the normal state. Moreover, pause release information for the solder print inspecting device 13 is sent also to the other external devices, such as the solder printing machine 12, through the communicating unit 40. When the operation of the solder print inspecting device 13 is restarted thereby, then, together with restarting the operation of the solder print inspecting device 13, the respective operations of the other external devices are also restarted with appropriate timing, to release the pause on the entirety of the manufacturing line 10.

Thereafter, the displaying portion 37a of the displaying unit 37 returns from the "Failed Product Information" screen to the normal menu screen.

On the other hand, if the operator determines that the failing product evaluation result for the printed substrate 1 by the solder print inspecting device 13 was incorrect, then, the operator presses the "OK Evaluation" button B1 to revise the evaluation result by the solder print inspecting device 13 to be a passing product evaluation.

When the "OK Evaluation" button B1 is pressed, the solder print inspecting device 13 not only releases the pause on the operation for conveying the printed substrate 1 out by the rail 25, but also performs a procedure for updating the control information described above. Specifically, not only is the value of the failed product count number decremented by one, but also the value of the passing product count number is incremented by one. Thereafter, the solder print inspecting device 13 updates the value of the operating status flag from the "1," which indicates "Paused," to "0," which indicates "Production in Progress," to return to the normal state. Given this, the printed substrate 1 for which the evaluation result has been revised to be a passing product, is sent to the component mounting machine 14 on the downstream side.

Furthermore, in the same manner as set forth above, the pause release information of the solder print inspecting device 13 is sent, through the communicating unit 40, to the other external devices, such as the solder printing machine 12, and the like. Doing so not only restarts the operation of the solder print inspecting device 13, in the case wherein the operation of the solder print inspecting device 13 is restarted, but also restarts the respective operations of the other external devices as well, with the appropriate timings, to release the pause on the manufacturing line 10 as a whole.

As described in detail above, along with the three-dimensional image G1, which shows the three-dimensional shape of the cream solder 3, when viewed from an arbitrary viewing direction, displayed in the displaying portion 37a of the displaying unit 37 in the present form of embodiment, but also the arrow image G2 which shows the operating direction K of the squeegee 92, the arrow image G3 which shows the conveying direction L of the printed substrate 1, the substrate image G4 which models the shape of the printed substrate 1, and the like, are also displayed.

As a result, the operator is able to ascertain immediately the relative orientation of the three-dimensional image G1 of the cream solder 3 relative to, for example, the operation of the squeegee by the solder printing machine 12, by looking at the displaying portion 37a of the displaying unit 37. The result enables early discovery and handling of occurrences of problems in the solder printing machine 12, and, by extension, of the causes of the occurrence, tendency for the occurrence, locations of occurrence, and the like, thereby making it possible to prevent a reduction in productivity.

Note that there is no limitation to the detail set forth in the embodiment described above, but rather the embodiment may be instead such as described below, for example. Of course, obviously there may be other examples of application and examples of modifications not illustrated in the below.

(a) In the embodiment set forth above the structure was such that the three-dimensional image G1 of the cream solder 3, for example, was displayed by displaying unit 37 provided by the solder print inspecting device 13 itself. There is no limitation thereto, but rather the structure may be one wherein the three-dimensional image G1 of the cream solder 3, and the like, is displayed by the displaying unit provided external to the solder print inspecting device 13.

For example, the structure may be one wherein the three-dimensional image G1 of the cream solder 3, and the like, is displayed on a displaying portion of an external device (such as a notebook PC, for example) that is connected through a LAN cable (a wired LAN) to the communicating unit 40 of the solder print inspecting device 13, or of a mobile terminal (a mobile telephone, smart phone, a tablet PC, or the like) that can communicate through a wireless LAN.

The structure set forth above makes it possible for the checking operation, described above, to be performed on the spot through the external device, such as the mobile terminal, without the operator having to go through the trouble of going to the solder print inspecting device 13, even when a failed product is produced by the solder print inspecting device 13. That is, the time required for the operator to go to the solder print inspecting device 13 is eliminated, making it possible to reduce the time over which the solder print inspecting device 13 is paused. The result is an improvement in the operating efficiency, an improvement in up-time of the solder print inspecting device 13, and, by extension, the ability to achieve an improvement in the up-time of the production line 10, enabling an increase in productivity.

Of course, the structure may be one wherein it is possible to display the three-dimensional image G1 of the cream solder 3, and the like, on both the displaying unit 37 of the solder print inspecting device 13 and the displaying portion of the external device.

(b) The content of the display that is displayed on the displaying unit 37 is not limited to the embodiment set forth above.

For example, in the embodiment set forth above the structure is one wherein, along with the three-dimensional image G1 that shows the three-dimensional shape of the cream solder 3 being displayed, in addition the arrow image G2 that displays the operating direction K of the squeegee 92 and the arrow image G3 that shows the conveying direction L of the printed substrate 1 are displayed as direction images indicating the operating directions of specific operations that are performed on the printed substrate 1 by the solder printing machine 12. There is no limitation thereto, but rather the structure may be one wherein only the arrow image G2 that shows the operating direction K of the squeegee 92, or the arrow image G3 that shows the conveying direction L of the printed substrate 1, one or the other, is displayed.

In a structure, such as in the embodiment set forth above, wherein the operating direction K of the squeegee 92 is always the same relative to the conveying direction L of the printed substrate 1, the operating direction K of the squeegee 92 can be ascertained indirectly, even if the arrow image G2 that shows the operating direction K of the squeegee 92 is not displayed directly, through ascertaining the conveying direction L of the printed substrate 1.

Of course, the structure may be one wherein a direction image that is neither the arrow image G2 that shows the operating direction K of the squeegee 92 nor the arrow image G3 that shows the conveying direction L of the printed substrate 1 is displayed as a direction image that shows an operating direction of a specific operation that is performed by the solder printing machine 12 on the printed substrate 1. For example, in a case wherein there is a solder printing machine 12 that has a function for rotating the printed substrate 1, such as a turntable, the structure may be one wherein a direction image that shows the direction of rotation is displayed.

Moreover, the structure may be one wherein, along with the two-dimensional image that shows the entirety of the printed substrate 1, displayed in the main display window W1, the arrow image that shows the operating direction K of the squeegee 92, and the arrow image that shows the conveying direction L of the printed substrate 1, are displayed as well. Doing this further facilitates the operator ascertaining the relative direction of the three-dimensional image G1 of the cream solder 3 in relation to, for example, the squeegee operation by the solder printing machine 12.

(c) Moreover, while, in regards to the content displayed by the displaying unit 37, in the embodiment set forth above the structure was one wherein a substrate image G4 wherein the shape of the printed substrate 1 can be identified is displayed along with the arrow images G2 and G3, the structure may instead be one wherein this is omitted. Moreover, the structure may be one wherein front versus back information that enables identification of the front or back of the printed substrate 1 is displayed, along with the three-dimensional image G1 of the cream solder 3, instead of, or in addition to, the substrate image G4.

In a structure wherein solder printing is performed on both the front and back of the printed substrate 1, when the printed substrate 1 is removed from the solder print inspecting device 13 to perform the checking operation on the printed substrate 1, there is the danger that the relative relationship between the front or back face of the printed substrate 1 and the three-dimensional image G1 of the cream solder 3 can become confused. In such a case, displaying the front versus back information, as described above, facilitates understanding of both relative relationships.

As in the embodiment set forth above, in a case wherein a portion of the peripheral edge part of the printed substrate 1 is cut away, it is possible to identify the front versus back of the printed substrate 1 through comparing with the substrate image G4, but if there is no cut-away portion, then, in a case where the shape of the printed substrate 1 is symmetrical on the front and the back, there is the danger that the relative relationship of the front versus back of the printed substrate 1 and the three-dimensional image G1 of the cream solder 3 can become confused. Consequently, the effect of displaying the front versus back information, as described above, is more salient in such a case.

For example, the structure may be one wherein, in a case wherein a "black background" arrow image G3 is displayed in relation to a substrate image G4 with a "white background", such as in the embodiment set forth above, this shows that the printed substrate 1 is the "front side," where, on the other hand, in the case wherein a "white background" arrow image G3 is displayed relative to a substrate image G4 with a "black background," this shows that the printed substrate 1 is the "back side," to display the front/back information as an image. Of course, the structure may be one wherein the front versus back information is displayed as text information, such as "Front Side" or "Back Side."

(d) In the embodiment set forth above, the setup is such that the printed substrate 1 is conveyed from the left to the right, when the manufacturing line 10 is viewed from the front. In other words, in the manufacturing line 10, the solder printing machine 12, the solder print inspecting device 13, the component mounting machine 14, and the reflow device 15 are provided, in that order, from the left side, in the manufacturing line 10.

There is no limitation thereto, but rather the structure may be one wherein the printed substrate 1 is conveyed from right to left, when the manufacturing line 10 is viewed from the front. That is, the structure may be one wherein the solder printing machine 12, the solder print inspecting device 13, the component mounting machine 14, and the reflow device 15 are disposed sequentially from the right. In such a case, the conveying direction L of the printed substrate 1 in the various devices 12 through 15 will also be set so as to be in the direction from right to left, when viewed from the front.

(e) In the embodiment set forth above, the operating direction K of the squeegee 92 is set in the direction that faces toward the front from the back, when the solder printing machine 12 is viewed from the front, but there is no limitation thereto for the operating direction K of the squeegee 92. For example, the structure may be one wherein the operating direction K of the squeegee 92 is "the direction from the front to the back," or "from the direction from the left to the right," "the direction from the right to the left," or "a direction that intersects the individual edges of an essentially rectangular printed substrate 1 at an angle," when viewed from the front of the solder printing machine 12.

(f) In the embodiment set forth above, the operating direction K of the squeegee 92 is in the same direction each time, such as in performing a printing operation wherein the squeegee 92 is slid, relative to a specific printed substrate 1, from the back side to the front side, and after the solder printing has been performed, the squeegee 92 is returned to the back side and, then, for the next printed substrate 1, the squeegee 92 is again slid from the back side to the front side.

There is no limitation thereto, but rather the structure may be one wherein the operating direction K of the squeegee 92 is varied as appropriate. For example, the structure may be one wherein the operating direction K of the squeegee 92 is alternated such as in performing the solder printing by sliding the squeegee 92 from the back side to the front side for a particular printed substrate 1 in order to perform the solder printing and, then, for the next printed substrate 1, sliding the squeegee 92 from the front side to the back side.

(g) In the embodiment set forth above, the solder print inspecting device 13 is structured so that when displaying the arrow image G2 that shows the operating direction K of the squeegee 92, the arrow image G3 that shows the conveying direction L of the printed substrate 1, the substrate image G4 that models the shape of the printed substrate 1, and the like, various types of information regarding the printed substrate 1, such as information regarding the operating direction K of the squeegee 92 and information regarding the conveying direction L of the printed substrate 1, are obtained from the solder printing machine 12.

There is no limitation thereto, but rather the structure may be one wherein the conveying direction L of the printed substrate 1 and the operating direction K of the squeegee 92 are always the same, such as in the embodiment set forth above, and the various types of information regarding the printed substrate 1, such as the information regarding the operating direction K of the squeegee 92 and the information regarding the conveying direction L of the printed substrate 1, are set and recorded in advance in the solder print inspecting device 13.

Note that because in a structure wherein the operating direction K of the squeegee 92 changes, as described in (f), above, it is not possible to record the operating direction K of the squeegee 92, or the like, in the solder print inspecting device 13 in advance, a structure wherein the various types of information regarding the printed substrate 1 are obtained from the solder printing machine 12, as in the embodiment set forth above, is preferred.

(h) In the embodiment set forth above, as causes for problems in the solder printing machine 12 when printing defects such as illustrated in FIG. 9 and FIG. 10 occur, the ability to imagine a case wherein the pressure of the squeegee 92 is too great, a case wherein the angle of attack a of the squeegee 92 is too great, and a case wherein, among the opening portions 90a of the metal mask 90, the downstream side in the direction of operation of the squeegee has become soiled was presented as an illustration.

However, because the tendencies for printing defects of the cream solder 3 to occur are different depending on, for example, the type of cream solder 3, the model of the solder printing machine 12, and the like, the problems in a solder printing machine when there is a case wherein the printing defects illustrated in FIG. 9 and the agent occur are not necessarily limited to the various causes listed above. Depending on the case, one may also consider the printing defects such as illustrated in FIG. 9 and FIG. 10 occurring in a case wherein the pressure of the squeegee 92 is too light, a case wherein the angle of attack a of the squeegee 92 is too small, a case wherein, of the opening portions 90a of the metal mask 90, soiling has occurred in the upstream side in the direction of operation of the squeegee, or the like.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

DESCRIPTION OF REFERENCE CHARACTERS

1: Printed Substrate
2: Land
3: Cream Solder
10: Manufacturing Line
12: Solder Printing Machine
13: Solder Print Inspecting Device
26: Three-Dimensional Measurement Lighting Unit
27: CCD Camera
30: Controlling Unit
36: Inputting Unit
37: Displaying Unit
38: Three-Dimensional Calculating Unit
39: Data Storing Unit
40: Communicating Unit
90: Metal Mask
92: Squeegee
G1: Three-Dimensional Image
G2, G3: Arrow Images
G4: Substrate Image
K: Squeegee Operating Direction

What is claimed is:

1. A solder print inspecting device for inspecting solder printed on a substrate by a solder printing machine, comprising:
   a light source that directs a light toward the substrate;
   an imaging controller that images the substrate illuminated with the light;
   a three-dimensional calculator that performs a three-dimensional measurement of the solder based on image data imaged by the imaging controller; and
   a processor that
      inspects the solder based on a value measured by the three-dimensional calculator,
      displays, on a display, a three-dimensional image showing a three-dimensional shape of the solder viewed from an arbitrary viewing direction based on a value measured by the three-dimensional calculator, and
      displays a direction image on the display, showing an operating direction of a specific operation performed by the solder printing machine on the substrate, together with the three-dimensional image of the solder.

2. The solder print inspecting device as set forth in claim 1, wherein the processor displays, as a direction image showing the operating direction of the specific operation, a direction image showing an operating direction of a squeegee.

3. The solder print inspecting device as set forth in claim 1, wherein the processor displays, as a direction image showing the operating direction of the specific operation, a direction image showing a conveying direction of the substrate.

4. The solder print inspecting device as set forth in claim 2, wherein the processor displays, as a direction image showing the operating direction of the specific operation, a direction image showing a conveying direction of the substrate.

5. The solder print inspecting device as set forth in claim 1, wherein the processor displays front/back information, such that the front/back of the substrate can be identified, along with the three-dimensional image of the solder.

6. The solder print inspecting device as set forth in claim 2, wherein the processor displays front/back information, such that the front/back of the substrate can be identified, along with the three-dimensional image of the solder.

7. The solder print inspecting device as set forth in claim 3, wherein the processor displays front/back information, such that the front/back of the substrate can be identified, along with the three-dimensional image of the solder.

8. The solder print inspecting device as set forth in claim 4, wherein the processor displays front/back information, such that the front/back of the substrate can be identified, along with the three-dimensional image of the solder.

9. The solder print inspecting device as set forth in claim 1, wherein the processor displays a substrate image, such that at least the shape of the substrate can be identified, along with the three-dimensional image of the solder.

10. The solder print inspecting device as set forth in claim 2, wherein the processor displays a substrate image, such that at least the shape of the substrate can be identified, along with the three-dimensional image of the solder.

11. The solder print inspecting device as set forth in claim 3, wherein the processor displays a substrate image, such that at least the shape of the substrate can be identified, along with the three-dimensional image of the solder.

12. The solder print inspecting device as set forth in claim 4, wherein the processor displays a substrate image, such that at least the shape of the substrate can be identified, along with the three-dimensional image of the solder.

13. The solder print inspecting device as set forth in claim 5, wherein the processor displays a substrate image, such that at least the shape of the substrate can be identified, along with the three-dimensional image of the solder.

14. The solder print inspecting device as set forth in claim 6, wherein the processor displays a substrate image, such that at least the shape of the substrate can be identified, along with the three-dimensional image of the solder.

15. The solder print inspecting device as set forth in claim 7, wherein the processor displays a substrate image, such that at least the shape of the substrate can be identified, along with the three-dimensional image of the solder.

16. The solder print inspecting device as set forth in claim 8, wherein the processor displays a substrate image, such that at least the shape of the substrate can be identified, along with the three-dimensional image of the solder.

17. The solder print inspecting device as set forth in claim 1,
wherein the processor performs processing to change the viewing direction based on a specific operation of an inputting unit to rotate, and display on the display, the three-dimensional image of the solder, and performs a process for rotating, and displaying on the display, at least two types of images that are displayed along with the three-dimensional image of the solder, while maintaining the relative relationships with the three-dimensional image.

18. The solder print inspecting device as set forth in claim 17, comprising:
a communicating unit that receives, from the solder printing machine, at least two types of information relating to the substrate, including direction information relating to an operating direction of a specific operation,
wherein the processor displays the direction image based on the at least two types of information regarding the substrate.

* * * * *